US012054584B2

(12) United States Patent
Okkel et al.

(10) Patent No.: US 12,054,584 B2
(45) Date of Patent: Aug. 6, 2024

(54) POUR POINT DEPRESSANT

(71) Applicant: BYK-Chemie GmbH, Wesel (DE)

(72) Inventors: Andreas Okkel, Wesel (DE); Jan Von Haaren, Alpen (DE); Irina Giebelhaus, Wesel (DE); Jörg Bömer, Wesel (DE); Markus Lorenz, Iffezheim (DE); Peter Walter Stannek, Wesel (DE); Stacy Scranton, Austin, TX (US); Jennifer Heitzer, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 0 days.

(21) Appl. No.: 17/624,620

(22) PCT Filed: Jul. 6, 2020

(86) PCT No.: PCT/EP2020/068953
§ 371 (c)(1),
(2) Date: Jan. 4, 2022

(87) PCT Pub. No.: WO2021/004991
PCT Pub. Date: Jan. 14, 2021

(65) Prior Publication Data
US 2022/0267523 A1    Aug. 25, 2022

(30) Foreign Application Priority Data

Jul. 8, 2019 (EP) .................... 19185035

(51) Int. Cl.
*C08G 73/02* (2006.01)
*C08G 69/48* (2006.01)
*C09K 8/524* (2006.01)
*C10L 1/238* (2006.01)
*C10L 10/16* (2006.01)

(52) U.S. Cl.
CPC .......... *C08G 73/024* (2013.01); *C08G 69/48* (2013.01); *C08G 73/0206* (2013.01); *C09K 8/524* (2013.01); *C10L 1/2381* (2013.01); *C10L 10/16* (2013.01); *C10L 2200/0446* (2013.01); *C10L 2230/14* (2013.01)

(58) Field of Classification Search
None
See application file for complete search history.

(56) References Cited

U.S. PATENT DOCUMENTS

| 4,803,003 | A | 2/1989 | Chung |
| 4,840,748 | A | 6/1989 | Bellos et al. |
| 5,393,795 | A | 2/1995 | Hedstrand et al. |
| 5,418,301 | A | 5/1995 | Hult et al. |
| 5,476,521 | A | 12/1995 | Gutierrez et al. |
| 5,543,469 | A | 8/1996 | Struglinkski et al. |
| 6,127,481 | A | 10/2000 | Janssen et al. |
| 8,540,885 | B2 | 9/2013 | Ebert et al. |
| 11,453,750 | B2 | 9/2022 | Nagelsdiek |
| 2008/0153931 | A1 | 6/2008 | Bruchmann et al. |
| 2011/0105661 | A1 | 5/2011 | Aksman |
| 2012/0059088 | A1 | 3/2012 | Hilfiger et al. |
| 2013/0041089 | A1* | 2/2013 | Forgione ............ C08G 18/0823 524/507 |
| 2013/0232858 | A1 | 9/2013 | Strittmatter et al. |
| 2015/0128484 | A1 | 5/2015 | Nordvik et al. |

FOREIGN PATENT DOCUMENTS

| EP | 1557441 A2 | 7/2005 |
| GB | 1568951 A | 6/1980 |
| JP | 2011231192 A * | 11/2011 |
| WO | 1985001956 A1 | 5/1985 |
| WO | 1996012755 A1 | 5/1996 |
| WO | 2009112379 A1 | 9/2009 |
| WO | 2013019704 A1 | 2/2013 |
| WO | 2013131837 A1 | 9/2013 |
| WO | 2018162403 A1 | 9/2018 |

OTHER PUBLICATIONS

JP 2011231192 A Eng Trans (Year: 2010).*
International Search Report and Written Opinion for International Application No. PCT/EP2020/068953 dated Oct. 28, 2020 (10 pages).

* cited by examiner

*Primary Examiner* — Jeffrey D Washville
(74) *Attorney, Agent, or Firm* — Fitch, Even, Tabin & Flannery LLP

(57) ABSTRACT

The invention relates to a polymer or oligomer comprising a) An oligomeric or polymeric core comprising carbon atoms and at least one of oxygen atoms and nitrogen atoms, and b) at least three hydrocarbyl terminal and/or pending groups having 12 to 100 carbon atoms, wherein the hydrocarbyl groups are linked to the core via c) a linking moiety comprising i) a urethane group and ii) a group selected from urethane group, urea group, and biuret group.

11 Claims, No Drawings

POUR POINT DEPRESSANT

The invention relates to a polymer or oligomer comprising an oligomeric or polymeric core, and at least three hydrocarbyl groups having 12 to 100 carbon atoms linked to the core. The invention further relates to the use of the polymer or oligomer for improving the cold flow properties of hydrocarbon based fluids, to a method of decreasing the amount of solid precipitate in a hydrocarbon based fluid, to a composition comprising the polymer or oligomer and a hydrocarbon based fluid, and to a process of preparing the polymer or oligomer. Hydrocarbon based fluids sometimes suffer from precipitation of solid materials, in particular paraffines, at low temperature. The temperature at which the first precipitate becomes visible as turbidity is referred to as cloud point. Upon further cooling, more precipitate is formed until the pour point is reached. In some situations, pressure changes can likewise induce precipitation of solid materials in hydrocarbon based fluids.

EP 1557441 describes nucleating agents based on hyperbranched polymers having a plurality of hydrocarbyl end groups. The nucleating agents are typically prepared by condensation reaction of a hydroxyl-functional hyperbranched polyester with fatty acids. The agents are described as pour point depressant.

WO 2018/162403 relates to the use of hydrophobically modified polyalkanolamines as wax inhibitors, pour point depressant, and additive for lubricants. The hydrophobically modified polyalkanolamines are prepared by a two-stage process. In a first reaction, trialkanolamines are reacted with one another in a polycondensation reaction to give a branched polyalkanolamine comprising terminal OH groups. In a second step, the resulting polyalkanolamine is modified by reacting the terminal OH groups with suitable reactant comprising hydrocarbyl groups. Typically, fatty acids are used as reactant in the second step.

US 2013/0232858 relates to the use of particular substituted ureas or urethanes for further improvement of the cold flow properties of mineral oils and crude oils. In typical embodiments, the substituted ureas are prepared by reaction of diisocyanates with fatty amines, whereas the substituted urethanes are prepared by reaction of diisocyanates with fatty alcohols.

There is an ongoing need to further materials which are suitable for improving the cold flow properties of hydrocarbon based fluids. Preferably, the materials should be effective at low usage levels.

The invention provides a polymer or oligomer comprising
a) An oligomeric or polymeric core comprising carbon atoms and at least one of oxygen atoms and nitrogen atoms, and
b) at least three hydrocarbyl terminal and/or pending groups having 12 to 100 carbon atoms, wherein the hydrocarbyl groups are linked to the core via
c) a linking moiety comprising i) a urethane group and ii) a group selected from urethane group, urea group, and biuret group.

An oligomer means a molecule of intermediate relative molecular mass, the structure of which essentially comprises a small plurality of units derived, actually or conceptually, from molecules of lower relative molecular mass. The oligomer or polymer generally comprises at least three repeating units on average, and has a molecular weight distribution, i.e. the quotient of weight average molecular weight and number average molecular weight is greater than 1.0.

The polymer or oligomer of the invention has at least three hydrocarbyl groups. The hydrocarbyl groups may be present as terminal groups or as pending groups linked to the oligomeric or polymeric core. When the oligomeric or polymeric core is a branched or hyperbranched structure, the hydrocarbyl groups will typically be present as groups pendant from the core. When the polymeric or oligomeric core is linear or essentially linear, the hydrocarbyl groups may be present as terminal groups as well as in the form of pendant groups.

Preferably, the hydrocarbyl groups are linear or branched aliphatic groups. In some embodiments, hydrocarbyl groups having 12 to 50 carbon atoms are preferred. The hydrocarbyl groups may be the same or different. In some embodiments, it is preferred that the hydrocarbyl groups differ in number of carbon atoms or in the degree or position of branching.

Generally, the polymer or oligomer of the invention comprises 3 to 600, preferably 3 to 300, more preferably 3 to 100 hydrocarbyl groups, and most preferably 3 to 60 hydrocarbyl groups b). In some embodiments, the polymer or oligomer comprises 6 to 60 hydrocarbyl groups b).

The hydrocarbyl groups are linked to the oligomeric or polymeric core via a linking moiety comprising i) a urethane group and ii) a group selected from urethane group, urea group, and biuret group. In preferred embodiments, the linking moiety is based on an organic diisocyanate. In some preferred embodiments, the group ii) selected from urethane group, urea group and biureth group is located between the oligomeric or polymeric core and the urethane group i).

In preferred embodiments of the polymer or oligomer of the invention, the linking moiety comprises a cycloaliphatic or aromatic group located between the urethane group i) and the group ii) selected from urethane group, urea group and biuret group. The cycloaliphatic group is preferably the hydrocarbyl group of isophorone diisocyanate. The aromatic group is preferably the hydrocarbyl group of 2,4- or 2,6 toluene diisocyanate. Suitably, the urethane group i) is located between the hydrocarbyl group having 12 to 100 carbon atoms and the group ii) selected from urethane group, urea group, and biuret group.

The oligomeric or polymeric core suitably is a branched or hyperbranched structure based on monomers having an average functionality above 2.0. An average functionality above 2.0 means that the monomers can form more than 2 links to other monomers. Alternatively, the oligomeric or polymeric core may be a linear or essentially linear structure.

In some embodiments, the core is a polymer or oligomer of ethyleneimine. Preferably, the core is a branched polyethyleneimine. The weight average molecular weight of the polyethyleneimine suitably is in the range of 250 to 70.000 g/mol, preferably 280 to 60.000 g/mol. Suitable polyethyleneimines are commercially available, for examples under the trade designations Lupasol® ex BASF or Epomin ex Nippon Shokubai. The molecular weights refer to data provided by suppliers of polyethyleneimines.

Optionally, the oligomeric or polymeric core, in particular a polyethyleneimine core, may be modified by reaction with amine reactive groups. Examples of modification agents are epoxides, such as glycidylethers, lactones, carboxylic acids, and acryloyl functional compounds.

In some embodiments, the core is an oligomer or polymer of an alkanolamine, referred to as poly alkanolamines. Oligomers or polymers of alkanolamines are obtained by condensation of alkanolamine, leading to ether links. If so desired, mixtures of alkanolamines may be employed. Typically, trialkanol amines are employed, for example triethanol amine.

The poly alkanolamines are obtainable by means of reaction stage of trialkanol amines of the general formula $N(R^1—OH)_3$ (Ia) with one another in a polycondensation reaction to give a branched poly alkanolamine having terminal OH-groups. Optionally, further monomers may be used for the polycondensation. The term "polycondensation" in usual manner stands for building up a polymer reacting monomers by elimination of small molecules. In the present case, the OH groups react with each other releasing water and forming ether bonds. Because each trialkanol amine (la) comprises three OH groups, branched poly alkanolamines are formed. The preparation of poly alkanolamines is generally known. U.S. Pat. No. 8,540,885 describes the preparation of poly alkanolamines from col. 3, I. 1 to col. 5, I. 40.

In some embodiments, the core is a polyamide. Polyamides are suitably prepared by reaction of polyamines with carboxylic acids or derivatives thereof. Suitable carboxylic acids have one, two or more carboxylic acid groups. It is also possible to use mixtures of carboxylic acids. Carboxylic anhydrides may be used as well. Examples of appropriate polyamine compounds are aliphatic linear polyamines, like 1,6-hexamethylendiamine, diethylentriamine (DETA), triethylentetramine (TETA), tetraethylenpentamine (TEPA), pentaethylenhexamine, hexaethylenheptamine and higher molecular homologues, linear condensation products according to the formula $NH_2—(C_2H_4NH)_n—C_2H_4—NH_2$ with n>5, dipropylentriamine, (3-(2-aminoethyl)aminopropylamine, N,N-bis(3-aminopropyl)methylamine, N,N-dimethyldipropylentriamine, and N,N'-bis(3-aminopropyl)-ethylendiamine, Tris(3-aminopropyl) amine, Tris(2-aminoethyl)amine; Further examples are Isophorondiamine, 4,4'-Diamino-diphenylmethane, 1,3- and 1,4-Xylylendiamine, 4,4'-Diaminodicyclohexylmethane, 1,4-Bis(aminomethyl)cyclohexane, 1-piperazineethaneamine, N,N'-bis-(2-aminoethyl) piperazine, N-[(2-aminoethyl) 2-aminoethyl]piperazine, di and/or polyamines based on polyalkylenoxides. In the preparation of suitable polyamide cores it is mandatory to make sure that the resulting polyamide has at least three reactive groups selected from hydroxyl, primary amine, and secondary amine. This can be achieved by selection of the molar ratio of amine groups to carboxylic acid groups, or by controlling the degree of conversion of amine groups and carboxylic acid groups.

In some embodiments, the core is a branched polyester. Branched polyesters having hydroxyl end groups are suitably prepared by condensation reaction of polyols having 2 to 6 hydroxyl groups and carboxylic acids. Suitable branched polyesters are obtainable by condensation reactions of polyols with dimethylol propionic acid. The preparation of such branched polyesters is described in U.S. Pat. No. 5,418,301. Suitable branched polyesters are commercially available under the trade designation Boltorn from Perstorp. The branched polyesters may optionally be modified by co-condensation monocarboxylic acids, for example saturated or unsaturated fatty acids.

It some preferred embodiments, the polymer or oligomer comprises amine groups neutralized by a carboxylic acid having 6 to 24 carbon atoms. It has been found that effectiveness of the polymers or oligomers as pour point depressant or precipitation inhibitor is improved, when it comprises amine groups neutralized by such carboxylic acids.

The polymers or oligomers of the invention have been found to modify and/or reduce the paraffin and/or wax precipitation in hydrocarbon based fluids at low temperature. This improves the cold flow properties hydrocarbon based fluids. Therefore, the invention further relates to the use of the polymer or oligomer for improving the cold flow properties of hydrocarbon based fluids. The polymer of the invention is also very suitable as a pour point depressant in hydrocarbon based fluids.

The invention also relates to a method of decreasing the amount of solid precipitate in a hydrocarbon based fluid upon temperature decrease or pressure change, comprising adding to the hydrocarbon based fluid a polymer or oligomer of the invention.

In a further aspect, the invention relates to a composition comprising
i) the polymer or oligomer of the invention and
ii) a hydrocarbon based fluid.

Examples of hydrocarbon based fluids include crude oil, fractions of crude oil, diesel fuel, metal working fluid, heating fuel, lubricant base oil, and lubricant.

Lubricant base oils are categorized into five groups by the American Petroleum Institute (API). Group I base oils are composed of fractionally distilled petroleum which is further refined with solvent extraction processes to improve certain properties such as oxidation resistance and to remove wax. Group II base oils are composed of fractionally distilled petroleum that has been hydrocracked to further refine and purify it. Group III base oils have similar characteristics to Group II base oils, except that Group III base oils have higher viscosity indexes. Group IV base oils are polyalphaolefins (PAOs). Group V is a catch-all group for any base oil not described by Groups I to IV.

The polymer or oligomer is effective in improving the cold flow properties, lowering the pour point, and reducing the amount of solid precipitate when employed in relatively low amounts relative to the hydrocarbon based fluid. Suitably, the amount of oligomer or polymer of the invention i) in the composition is in the range of 0.001 to 1.000, preferably 0.010 to 0.800, more preferably 0.010 to 0.400% by weight, calculated on the total weight of the composition.

The composition according to the present invention may comprise at least one further additive, such as an antioxidant, oxidation inhibitor, corrosion inhibitor, friction modifier, metal passivator, rust inhibitor, anti-foaming agent, viscosity index enhancer, dispersant, detergent, extreme-pressure agent, or additional pour point depressant.

The invention further relates to a process of preparing the polymer or oligomer of the invention.

The process comprises the steps of
i) Reacting a mono-alcohol having a hydrocarbyl group having 12 to 100 carbon atoms with a diisocyanate to provide an intermediate having one isocyanate group, one urethane group, and one hydrocarbyl group having 12 to 100 carbon atoms,
ii) Providing an oligomeric or polymeric core comprising carbon atoms and at least one of oxygen atoms and nitrogen atoms, and having at least three reactive groups selected from hydroxyl, primary amine, secondary amine, and mixtures thereof,
iii) Reacting the intermediate prepared in step i) with the oligomeric or polymeric core provided in step ii).

In the first step, a mono-alcohol having a hydrocarbyl group having 12 to 100 carbon atoms is reacted with a diisocyanate to provide an intermediate having one isocyanate group, one urethane group, and one hydrocarbyl group having 12 to 100 carbon atoms. In order to obtain the intermediate selectively, it is preferred to use diisocyanates having two isocyanate groups with different reactivity. Examples of such diisocyanates are isophorone diisocyanate and 2,4-toluene diisocyanate, as well as mixtures thereof. Alternatively or additionally it is possible to use a molar excess of diisocyanate over the mono alcohol in the first reaction step. If so desired, it is possible to remove unreacted diisocyanate after the first step, for example by distillation. In some embodiments, a mixture of different mono alcohols is used in the first reaction step. The mono alcohol in the mixture may vary in the number of carbon atoms of the hydrocarbyl group, as well as in the degree or position of branching of the hydrocarbyl group.

In the second step, an oligomeric or polymeric core as described above is provided. The oligomeric or polymeric core functional groups selected from hydroxyl groups, primary amine groups, secondary amine groups, or a combination thereof, which are capable of reacting with isocyanate groups. The oligomeric or polymeric core has at least three of such groups. Generally, 3 to 600 of such groups are present on the oligomeric or polymeric core. In the third step, the intermediate prepared in step i) is reacted with the oligomeric or polymeric core. In this step, the isocyanate groups of the intermediate react with the hydroxyl and/or primary or secondary amine groups to form urethane or urea groups, respectively. The molar ratio of intermediate and oligomeric core is selected to ensure that at least 3 intermediate molecules are linked to each oligomeric or polymeric core. Generally, 3 to 600 intermediate molecules are linked to each oligomeric or polymeric core. In the third step, all or only a part of the isocyanate reactive hydroxyl groups or amine groups of oligomeric or polymeric core are reacted with the isocyanate-functional intermediate, provided that at least at least 3 intermediate molecules are linked to each oligomeric or polymeric core.

Polymers or oligomers according to the invention wherein the linking moiety c) comprises i) a urethane group and ii) a biuret group are obtainable by a process comprising the steps of
  i) Reacting a mono-alcohol having a hydrocarbyl group having 12 to 100 carbon atoms with a mono- or diisocyanate having a uretdione group to provide an intermediate having a uretdione group, one or two urethane groups, and one or two hydrocarbyl groups having 12 to 100 carbon atoms,
  ii) Providing an oligomeric or polymeric core comprising carbon atoms and at least one of oxygen atoms and nitrogen atoms, and having at least three reactive groups selected from primary amine, secondary amine, and combinations thereof,
  iii) Reacting the intermediate prepared in step i) with the oligomeric or polymeric core provided in step ii).

EXAMPLES

General Methods

Molecular Weight

In the case of substances without molecular uniformity the stated molecular weights—below as already in the foregoing description—represent average values of the numerical mean. The molecular weights or number-average molecular weights $M_n$, are determined by means of gel permeation chromatography against a polystyrene standard.

Hydroxyl Number

The alcoholic hydroxyl groups were reacted by acetylation with an excess of acetic anhydride. The excess acetic anhydride was hydrolyzed into acetic acid by adding water and titrated back using ethanolic KOH. The hydroxyl number is the KOH quantity in mg, which is equivalent to the number of hydroxyl groups present in 1 g of substance (according to DIN ISO 4629).

Amine Number Perchloric acid ($HClO_4$) in acetic acid has proved to be a suitable titration agent for organic bases containing nitrogen as well as primary, secondary and tertiary amine groups. Acid solvents such as acetic acid have stood the test in determining weak organic bases (good dissolving properties, proton-donating acid solvent). Additions of inert solvents such as cyclohexane, dioxane, chlorobenzene, acetone and methyl ethyl ketone can improve the titration of very weak bases (according to DIN 16945).

NCO Values

The free NCO content of the polyisocyanates employed and also the course of the NCO addition reactions, are determined in accordance with EN ISO 9369 by reaction with dibutylamine and subsequent titration of the amine excess.

NMR

The NMR measurements were carried out on a Bruker DPX 300 at 300 MHZ ($^1H$) or 75 MHZ ($^{13}C$). Solvents used were deuterated chloroform ($CDCl_3$) and deuterated dimethyl sulfoxide ($DMSO-d_6$).

Preparation of the Intermediate Products

Preparation of Intermediate Products A

A clean dry four-necked flask (500 ml) equipped with a condenser, stirrer, temperature sensor and a nitrogen line was charged with isocyanate component and heated up to 80° C. A solution of the alcohol in xylene was added so that the temperature did not exceed 85° C. The molar ratio of NCO groups to OH groups was 2:1. After complete addition the reaction mixture was stirred at this temperature. NCO value was measured as reaction control (DIN EN ISO 9369).

TABLE 1

Preparation of intermediate products A

| Intermediate product A | NCO component | wt. % NCO component | Alcohol 50% solution in xylene | wt. % alcohol solution |
|---|---|---|---|---|
| A1 | TDI | 15.26 | Nafol 24+ | 84.74 |
| A2 | TDI | 16.58 | Nafol 20 + ED | 83.42 |
| A3 | TDI | 16.29 | Mixture of Nafol 24+(45), Nafol 20 + ED(45), Isofol 24 (10) | 83.71 |
| A4 | Des 3400 | 18.15 | Nafol 20 + ED | 81.85 |
| A5 | Des 3400 | 16.74 | Nafol 24+ | 83.26 |
| A6 | TDI | 22.53 | Nafol 1822 | 77.47 |
| A7 | TDI | 15.55 | Nafol 24+ (95)/Nafol 1822(5) | 84.50 |
| A8 | TDI | 19.00 | Nafol 1822(50)/ Nafol 24+(50) | 81.00 |
| A9 | TDI | 15.90 | Nafol 24+ (50)/Unilin 350 (50) | 84.10 |
| A10 | TDI | 15.40 | Nafol 20 + ED (50)/Nafol 24+(50) | 84.60 |
| A11 | TDI | 16.70 | Nafol 24+ | 83.30 |
| A12 | TDI | 16.58 | Nafol 20 + ED | 83.42 |
| A13 | TDI | 15.26 | Nafol 24+ | 84.74 |

TDI = 2,4-Toluylenediisocyanate;
Des 3400 = Desmodur N3400, aliphatic uretdione with a free NCO-value of 21.4% Covestro;
Nafol 1822, Nafol 20 + ED, Nafol 24+, = blends of linear alcohols from C20 to C36 from Sasol;
Isofol 24 = defined branched Guerbert alcohol from Sasol;
Unilin 350 = linear alcohols with carbon chain lengths up to C50 from Baker Hughes;

Preparation of Intermediate Products B (Polymeric or Oligomeric Cores Based on Polyethylene Imine)

A clean dry four-necked flask (500 ml) equipped with a condenser, KPG-stirrer, temperature sensor and a nitrogen line was charged with polyamine (with different molecular weight presented in the table) and heated up to 100° C. The modification component (caprolactone, epoxide, acrylate or lauric acid) was added so that the temperature did not exceed 120° C. After complete addition the reaction mixture was stirred at that temperature until the modification component was completely reacted (controlled by the means of NMR).

TABLE 2

Preparation of intermediate products B (polymeric or oligomeric cores based on polyethylene imine)

| Intermediate products B | PEI | wt. % aminic component | Modification component | wt. % modification |
|---|---|---|---|---|
| B1 | 1300 | 41.65 | 2-EHGE | 58.35 |
| B2 | 300 | 43.50 | CAPA | 56.50 |
| B3 | 300 | 32.05 | 2-EHGE | 67.95 |
| B4 | 1300 | 53.81 | CAPA | 46.19 |
| B5 | 25000 | 43.15 | 2-EHGE | 56.85 |
| B6 | 1300 | 39.89 | Lauric acid | 60.11 |
| B7 | 300 | 30.49 | Lauric acid | 69.51 |
| B8 | 300 | 32.29 | 2-EHA | 67.71 |
| B9 | 1300 | 41.91 | 2-EHA | 58.09 |
| B10 | 1300 | 37.12 | C12/14AGE | 62.88 |
| B11 | 1300 | 46.04 | Lauric acid | 55.96 |
| B12 | 1300 | 41.10 | C12/14AGE/ Lauric acid | 34.81/24.09 |

CAPA = ε-Caprolactone;
2-EHGE = 2-ethylhexyl glycidyl ether;
2-EHA = 2-ethylhexyl acrylate,
C12/14AGE = C12 to C14 alkyl glycidyl ether;
PEI = polyethyleneimine cores with different Mw;

Preparation of Intermediate Product C (Polymeric or Oligomeric Cores Based on Poly Triethanolamine)

A clean dry four-necked flask (500 ml) equipped with a condenser, KPG-stirrer, temperature sensor and a nitrogen line was charged with triethanolamine and phosphinic acid (50% in $H_2O$). The mixture was heated up to 230° C. and the reaction water was removed under reduced pressure. After 4 h of reaction time the remaining water was removed under reduced pressure (500 mbar). After 3 h the reaction mixture was cooled down to 140° C. at 100 mbar and after 30 min it was cooled down to the room temperature. Amine values (according to DIN 16945) and hydroxyl values (according to DIN ISO 4629) were measured as reaction control.

TABLE 3

Preparation of intermediate products C (polymeric or oligomeric cores based on poly triethanolamine)

| Intermediate products C | Aminic component | wt. % Aminic component | Phosphinic acid | wt. % catalyst | OHV (mgKOH/g) | AV (mg KOH/g) |
|---|---|---|---|---|---|---|
| C1 | TEA | 99.33 | Phosphinic acid (50% in H2O) | 0.67 | 579 | 420 |
| C2 | TEA | 99.20 | Phosphinic acid (50% in H2O) | 0.80 | 538 | 423 |

TEA = triethanolamine

Preparation of Intermediate Product D (Polyamide Polymeric or Oligomeric Core Based on Polyamine and Carboxylic Acid)

A clean dry four-necked flask (500 ml) equipped with a condenser with water separator, KPG-stirrer, temperature sensor and a nitrogen line was charged with adipic acid and tall oil fatty acid and heated up to 80° C. Tetraethylenpentamine was added to this mixture. After complete addition it was heated up to 180° C. and the reaction water was removed under reduced pressure. Reaction was monitored by measuring acid and amine values.

TABLE 4

Preparation of intermediate product D

| Intermediate product D | Aminic component | wt. % of aminic component | Acidic component: Adipic acid/ tall oil fatty acid | wt. % of acidic component |
|---|---|---|---|---|
| D1 | TEPA | 30.1 | adipic acid/ TOF (1/2) | 69.9 |

TOF = tall oil fatty acid;
TEPA = Tetraethylenpentamine

Preparation of the Products According to the Invention

Preparation of Final Products AB, AC and AD

A clean dry four-necked flask (500 ml) equipped with a condenser, KPG-stirrer, temperature sensor and a nitrogen line was charged with Intermediate B, C or D and xylene (the active substance was adjusted to 40%) and heated up to 80° C. Additionally intermediate A was added, so that the temperature did not exceed 85° C. After complete addition, the reaction mixture was stirred at that temperature until no more isocyanate groups could be detected.

TABLE 5

Preparation of products AB

| Product | Intermediate product A | wt. % of intermediate product A | Intermediate product B | wt. % of intermediate product B |
|---|---|---|---|---|
| AB1 | A2 | 82.14 | B1 | 17.86 |
| AB2 | A2 | 85.59 | B4 | 14.41 |
| AB3 | A4 | 82.30 | B1 | 13.70 |

TABLE 5-continued

Preparation of products AB

| Product | Intermediate product A | wt. % of intermediate product A | Intermediate product B | wt. % of intermediate product B |
|---|---|---|---|---|
| AB4 | A1 | 82.01 | B1 | 17.99 |
| AB5 | A1 | 77.83 | B3 | 22.17 |
| AB6 | A3 | 82.49 | B1 | 17.51 |
| AB7 | A1 | 82.54 | B5 | 17.46 |
| AB8 | A3 | 83.00 | B5 | 17.00 |
| AB9 | A1 | 82.65 | B2 | 17.35 |
| AB10 | A3 | 83.11 | B2 | 16.89 |
| AB11 | A1 | 85.49 | B4 | 14.51 |
| AB12 | A2 | 82.92 | B5 | 17.08 |
| AB13 | A2 | 77.43 | B7 | 22.57 |
| AB14 | A2 | 81.78 | B6 | 18.22 |
| AB15 | A3 | 81.12 | B6 | 18.88 |
| AB16 | A1 | 78.98 | B8 | 21.02 |
| AB17 | A3 | 77.68 | B8 | 22.32 |
| AB18 | A1 | 82.98 | B9 | 17.02 |
| AB19 | A3 | 81.86 | B9 | 18.14 |
| AB20 | A2 | 82.50 | B9 | 17.50 |
| AB21 | A4 | 85.78 | B6 | 14.22 |
| AB22 | A5 | 87.62 | B5 | 12.38 |

TABLE 6

Preparation of products AC

| Product | Intermediate product A | wt. % of intermediate product A | Intermediate product C | wt. % of intermediate product C |
|---|---|---|---|---|
| AC1 | A6 | 88.9 | C1 | 11.1 |
| AC2 | A8 | 90.4 | C1 | 9.6 |
| AC3 | A7 | 94.3 | C1 | 5.7 |
| AC4 | A9 | 94.0 | C1 | 5.9 |
| AC5 | A10 | 94.4 | C1 | 5.6 |
| AC6 | A11 | 91.0 | C1 | 9.0 |
| AC7 | A6 | 87.6 | C2 | 12.4 |
| AC8 | A8 | 89.8 | C2 | 10.2 |
| AC9 | A7 | 91.4 | C2 | 8.6 |
| AC10 | A9 | 94.2 | C2 | 5.8 |
| AC11 | A10 | 94.4 | C2 | 5,.6 |
| AC12 | A11 | 91.3 | C2 | 8.7 |

TABLE 7

Preparation of product AD

| Product | Intermediate product A | wt. % of intermediate product A | Intermediate product D | wt. % of intermediate product D |
|---|---|---|---|---|
| AD1 | A1 | 71.3 | D1 | 28.7 |

The products according to the invention were provided as solutions in xylene, having a non-volatile content of 40% by weight.

Application Tests

Raw Materials
Exxsol D 100: Hydrocarbons, C13-C16, isoalkanes, cyclics, <2% aromatics purchased from Shell Chemicals Europe
Sasolwax 5203: paraffinic hydrocarbons purchased from Sasol
Sasolwax 5803: paraffinic hydrocarbons purchased from Sasol
Sasolwax C80: synthetic wax, paraffinic hydrocarbons purchased from Sasol

TABLE 8

Preparation of synthetic crude oil formulations

| Raw Materials | 4% wt. Wax Synthetic Crude Oil 1 [g] | 15% wt. Wax Synthetic Crude Oil 2 [g] | 5% wt. Wax Synthetic Crude Oil 3 [g] |
|---|---|---|---|
| Exxsol D 100 (1) | 460.80 | 408.00 | 456.00 |
| Xylene (2) | 307.20 | 272.00 | 304.00 |
| Sasolwax 5203 (3) | 16.00 | 40.00 | 32.00 |
| Sasolwax 5803 (4) | 16.00 | 40.00 | — |
| Sasolwax C80 (5) | — | 40.00 | 8.00 |
| Mixing ratio (EXXSOL D 100:Xylene) | (60:40) | (60:40) | (60:40) |
| Pour point [° C.] | 12 | 45 | 8 |

For the preparation of synthetic crude oil 1 all raw materials were mixed and placed in the oven for 2 hours at 60° C. (140° F.).

For the preparation of synthetic crude oil 2 and 3 all raw materials were mixed and placed in the oven for 4 hours at 80° C. (176° F.).

The warm synthetic crude oil was filled up in beakers for further application tests.

Working Method: Cold Finder Test
Apparatus: PSL Systemtechnik Cold Finger equipment CF15

The cold finger test was used to determine the wax inhibition properties of the prepared additives. The wax inhibitions was determined by exposing the crude oil to a cold metal finger surface in the presence/absence of wax inhibitor. At the beginning of the test the initial weight of metal finger was determined. The deposits on a cold metal finger surface in absence of wax inhibitor was set to 100%. The inhibition was calculated using formula 1

$$\text{Inhibition [\%]} = \frac{(Wa - Wp) * 100\%}{Wa} \quad (1)$$

Wa: weight of wax deposits on a cold metal finger surface in absence of wax inhibitor (in g)
Wp: weight of wax deposits on a cold metal finger surface in presence of wax inhibitor (in g)

63.2 g of crude oil was filled in a beaker and heated up to 80° C. for 1 h. Then 40/20/16 μL of an additive was added with an Eppendorf pipette to the 63.2 g of crude oil. The mixture of crude oil with an additive was heated up to 80° C. 30 min. A magnetic stir bar was added to each beaker. The beakers with the prepared samples were placed into the rack and the metal finger was inserted into the prepared samples. Then the magnetic stirrer was switched on (750 rpm). The cold finger with the deposits was weighed.

Parameters for different synthetic crude oils:
Cold Finger setup synthetic Crude Oil 2
Rack temperature 57° C.
Finger temperature 45° C.
Test procedure time: 2 hours
Stirring speed: 750 rpm
Cold Finger setup synthetic Crude Oil 3
Rack temperature 44° C.
Finger temperature 24° C.
Test procedure time: 2 hours
Stirring speed: 750 rpm
Application Results: Cold Finger Test
The application tests were performed in the synthetic crude oil 2 (with 15% wt. wax) and in the synthetic crude oil 3 (with 5% wt. wax). Excellent wax inhibition properties were achieved in both crude oil systems using samples prepared according to the invention.

TABLE 9

Cold Finger Test in Synthetic Crude Oil 2

| | Test time [h] | Weight of deposit without additive [g] | Additive dosage 100 ppm active substance | | Additive dosage 50 ppm active substance | |
|---|---|---|---|---|---|---|
| | | | Weight of deposit [g] | Inhibition [%] | Weight of deposit [g] | Inhibition [%] |
| AB11 | 2 | 1.647 | 0.475 | 71 | 0.425 | 74 |
| AB18 | 2 | 1.608 | 0.501 | 69 | 0.457 | 72 |
| AB22 | 2 | 1.547 | 0.508 | 67 | 0.490 | 68 |
| AB9 | 2 | 1.356 | 0.560 | 59 | 0.434 | 68 |
| AB7 | 2 | 1.444 | 0.548 | 66 | 0.584 | 63 |
| AC1 | 2 | 1.399 | 0.914 | 35 | 1.145 | 18 |
| AC2 | 2 | 1.471 | 0.684 | 54 | 0.706 | 52 |
| AC3 | 2 | 1.560 | 0.359 | 77 | 0.399 | 74 |
| AC4 | 2 | 1.407 | 0.397 | 72 | 0.459 | 67 |
| AC5 | 2 | 1.889 | 0.357 | 81 | 0.447 | 76 |
| AC6 | 2 | 1.676 | 0.441 | 74 | 0.405 | 76 |
| AC7 | 2 | 2.078 | 1.167 | 44 | 1.385 | 33 |
| AC8 | 2 | 1.509 | 0.629 | 58 | 0.719 | 52 |
| AC9 | 2 | 1.364 | 0.444 | 67 | 0.477 | 65 |
| AC10 | 2 | 1.630 | 0.500 | 69 | 0.519 | 68 |
| AC11 | 2 | 1.515 | 0.442 | 71 | 0.629 | 59 |
| AC12 | 2 | 2.125 | 0.457 | 79 | 0.492 | 77 |

TABLE 10

Cold Finger Test in Synthetic Crude Oil 3

| | Test time [h] | Weight of deposit without additive [g] | Additive dosage 50 ppm active substance | | Additive dosage 20 ppm active substance | |
|---|---|---|---|---|---|---|
| | | | Weight of deposit [g] | Inhibition [%] | Weight of deposit [g] | Inhibition [%] |
| AB19 | 2 | 0.946 | 0.208 | 78 | 0.206 | 78 |
| AB5 | 2 | 1.233 | 0.297 | 76 | 0.278 | 77 |
| AB6 | 2 | 1.233 | 0.080 | 94 | 0.299 | 76 |
| AB17 | 2 | 1.418 | 0.256 | 82 | 0.386 | 73 |
| AB16 | 2 | 1.069 | 0.246 | 77 | 0.289 | 73 |
| AC1 | 2 | 1.155 | 0.170 | 85 | 0.692 | 40 |
| AC2 | 2 | 0.961 | 0.276 | 71 | 0.749 | 22 |
| AC3 | 2 | 0.961 | 0.260 | 73 | 0.241 | 75 |
| AC4 | 2 | 1.050 | 0.260 | 75 | 0.762 | 27 |
| AC5 | 2 | 1.050 | 0.219 | 79 | 0.619 | 41 |
| AC6 | 2 | 0.960 | 0.307 | 68 | 0.700 | 27 |
| AC7 | 2 | 1.023 | 0.201 | 80 | 0.933 | 9 |
| AC8 | 2 | 0.987 | 0.230 | 77 | 0.838 | 15 |
| AC9 | 2 | 0.987 | 0.256 | 74 | 0.491 | 50 |
| AC10 | 2 | 1.034 | 0.315 | 70 | 0.648 | 37 |
| AC11 | 2 | 1.034 | 0.206 | 80 | 0.425 | 59 |
| AC12 | 2 | 1.111 | 0.321 | 71 | 0.823 | 19 |
| AD1 | 2 | 1.155 | 0.281 | 76 | 1.008 | 13 |

From the results in Tables 9 and 10 it can be concluded that the oligomers and polymers of the invention bring about significant reductions of wax precipitation in a variety of formulations.

Working Method 2: Pour Point Test
Apparatus: Water Bath

Pour Point reduction temperature [° C.] was determined as a difference between start temperature and the last temperature at which the crude oil is still fluent.

Test Procedure Synthetic Crude Oil 1

Synthetic crude oil was heated up for 1 hour at 60° C. (140° F.). 50 mL of the Crude Oil were placed into a test jar according to ASTM Norm D 5853 at room temperature. The additive was added to the crude oil sample with an Eppendorf pipette. The sample was stored 30 minutes at 60° C. (140° F.). After that the test jar was placed in a cold bath (15° C. (59° F.)). After 30 minutes in a cold bath the test jar was slowly removed from the water batch and held horizontal for 5 sec. When movement was observed the test jar was immediately returned into the 60° C. (140° F.) water bath for 30 min. After that the sample was placed again into the cold bath at 3° C. (5° F.) lower than before. This procedure is repeated until there is no visible movement of the crude oil in the horizontal for 5 seconds. The last temperature at which movement is visible is taken as the pour point.

Test Procedure Synthetic Crude Oil 2 & 3

Synthetic crude oil was heated up for 1 hour at 80° C. (176° F.). 50 mL of the Crude Oil were placed into the test jar (ASTM Norm D 5853) at room temperature. The additive was added to the crude oil sample with an Eppendorf pipette. The sample was stored 30 minutes at 80° C. (176° F.). After that the test jar was placed in a cold bath (45° C. (113° F.)) cold bath for synthetic crude oil 2 or in a 12° C. (54° F.) for synthetic crude oil 3. After 30 minutes in a cold bath the sample was slowly removed from the water batch and held horizontal for 5 sec. When movement was observed the test jar was immediately returned into the 60° C. (140° F.) water bath for 30 min. After that the sample was placed again into the cold bath at 3° C. (5° F.) lower than before. This procedure is repeated until there is no visible movement of the crude oil in the horizontal for 5 seconds. The last temperature at which movement is visible is taken as the pour point.

Application Results: Pour Point Test

The application tests were performed in the synthetic crude oil 1 (with 4% wt. wax), in the synthetic crude oil 2 (with 15% wt. wax) and in the synthetic crude oil 3 (with 5% wt. wax). A significant pour point reduction in all 3 systems was observed using samples prepared according to the invention which are based on modified polyethyleneimines.

TABLE 11

Pour Point Test in Synthetic Crude Oil 1

| | Additive dosage 50 ppm active substance Pour Point reduction [° C.] | Additive dosage 20 ppm active substance Pour Point reduction [° C.] |
|---|---|---|
| AB2 | 18 | 15 |
| AB3 | 15 | 15 |
| AB10 | 18 | 12 |
| AB14 | 18 | 12 |
| AB21 | 15 | 12 |
| AC1 | 21 | 15 |
| AC2 | 15 | 12 |
| AC3 | 9 | 6 |
| AC4 | 9 | 9 |
| AC5 | 9 | 6 |
| AC6 | 9 | 6 |
| AC7 | 18 | 15 |
| AC8 | 18 | 12 |
| AC9 | 9 | 6 |
| AC10 | 9 | 6 |
| AC11 | 12 | 9 |
| AC12 | 6 | 6 |

TABLE 12

Pour Point Test in Synthetic Crude Oil 3

| | Additive dosage 100 ppm active substance Pour Point reduction [° C.] | Additive dosage 50 ppm active substance Pour Point reduction [° C.] |
|---|---|---|
| AB14 | 24 | 21 |
| AB1 | 15 | 9 |
| AB15 | 9 | 9 |
| AB13 | 9 | 6 |
| AB20 | 9 | 6 |
| AC1 | 18 | 15 |
| AC2 | 9 | 3 |
| AC3 | 3 | 3 |
| AC4 | 3 | 3 |
| AC5 | 3 | 3 |
| AC6 | 3 | 3 |
| AC7 | 9 | 9 |
| AC8 | 9 | 6 |
| AC9 | 3 | 3 |
| AC10 | 3 | 3 |
| AC11 | 3 | 3 |
| AC12 | 3 | 3 |
| AD1 | 6 | 6 |

TABLE 13

Pour Point Test in Synthetic Crude Oil 2

| | Additive dosage 50 ppm active substance Pour Point reduction [° C.] | Additive dosage 20 ppm active substance Pour Point reduction [° C.] |
|---|---|---|
| AB4 | 18 | 12 |
| AB18 | 18 | 12 |
| AB8 | 12 | 9 |
| AB19 | 12 | 9 |
| AB12 | 15 | 6 |
| AC1 | 6 | 6 |
| AC2 | 6 | 6 |
| AC3 | 9 | 3 |
| AC4 | 9 | 3 |
| AC5 | 6 | 3 |
| AC6 | 9 | 3 |
| AC7 | 9 | 3 |
| AC8 | 9 | 3 |
| AC9 | 9 | 3 |
| AC10 | 9 | 3 |
| AC11 | 6 | 3 |
| AC12 | 3 | 3 |
| AD1 | 9 | 3 |

From the results in Tables 11, 12, and 13 it can be concluded that the oligomers and polymers of the invention bring about significant reductions of the pour point at low dosage and in a variety of formulations.

The invention claimed is:

1. A polymer or oligomer comprising
   a) an oligomeric or polymeric core comprising carbon atoms and at least one of oxygen atoms and nitrogen atoms, the core comprising one or more of a polymer or oligomer of ethyleneimine, a polymer or oligomer of a trialkanol amine, a branched polyester, and a polyamide, and
   b) at least three hydrocarbyl terminal and/or pending groups having 12 to 100 carbon atoms, wherein the hydrocarbyl groups are linked to the core via
   c) a linking moiety comprising i) a urethane group and ii) one or more of a urethane group, a urea group, and a biuret group.

2. The polymer or oligomer according to claim 1, wherein the hydrocarbyl groups are linear or branched aliphatic groups.

3. The polymer or oligomer according to claim 1, wherein the polymer or oligomer comprises 3 to 600 hydrocarbyl groups b).

4. The polymer or oligomer according to claim 1, wherein the linking moiety comprises an aromatic group located between the urethane group and the group selected from urethane group, urea group and biuret group.

5. The polymer of oligomer according to claim 1, wherein the polymer or oligomer comprises amine groups neutralized by a carboxylic acid having 6 to 24 carbon atoms.

6. A method of decreasing the amount of solid precipitate in a hydrocarbon based fluid upon temperature decrease, comprising adding to the hydrocarbon based fluid a polymer or oligomer according to claim 1.

7. A composition comprising
   i) the polymer or oligomer according to claim 1 and
   ii) a hydrocarbon based fluid.

8. The composition according to claim 7, wherein the hydrocarbon based fluid comprises at least one of crude oil, metal working fluid, diesel fuel, heating fuel, a lubricant, and a lubricant base oil.

9. The composition according to claim 7, wherein the amount of oligomer or polymer i) is in the range of 0.001 to 1.000% by weight, calculated on the total weight of the composition.

10. A process of preparing a polymer or oligomer, comprising the steps of
    i) reacting a mono-alcohol having a hydrocarbyl group having 12 to 100 carbon atoms with a diisocyanate to provide an intermediate having one isocyanate group, one urethane group, and one hydrocarbyl group having 12 to 100 carbon atoms,
    ii) providing an oligomeric or polymeric core comprising one or more of a polymer or oligomer of ethyleneimine, a polymer or oligomer of a trialkanol amine, a branched polyester, and a polyamide,
    iii) reacting the intermediate prepared in step i) with the oligomeric or polymeric core provided in step ii);
    the resulting polymer or oligomer comprising:
    a) an oligomeric or polymeric core comprising carbon atoms and at least one of oxygen atoms and nitrogen atoms, and
    b) at least three hydrocarbyl terminal and/or pending groups having 12 to 100 carbon atoms, wherein the hydrocarbyl groups are linked to the core via
    c) a linking moiety comprising i) a urethane group and ii) one or more of a urethane group, a urea group, and a biuret group.

11. A process of preparing a polymer or oligomer, comprising the steps of
    i) reacting a mono-alcohol having a hydrocarbyl group having 12 to 100 carbon atoms with a mono- or diisocyanate having a uretdione group to provide an intermediate having a uretdione group, one or two urethane groups, and one or two hydrocarbyl groups having 12 to 100 carbon atoms,
    ii) providing an oligomeric or polymeric core comprising one or more of a polymer or oligomer of ethyleneimine, a polymer or oligomer of a trialkanol amine, a branched polyester, and a polyamide,
    iii) reacting the intermediate prepared in step i) with the oligomeric or polymeric core provided in step ii);
    the resulting polymer or oligomer comprising:
    a) an oligomeric or polymeric core comprising carbon atoms and at least one of oxygen atoms and nitrogen atoms, and b) at least three hydrocarbyl terminal and/or pending groups having 12 to 100 carbon atoms, wherein the hydrocarbyl groups are linked to the core via
c) a linking moiety comprising a urethane group and a biuret group.

* * * * *